(12) United States Patent
Resconi et al.

(10) Patent No.: US 8,101,695 B2
(45) Date of Patent: Jan. 24, 2012

(54) PROPYLENE BASED TERPOLYMERS

(75) Inventors: Luigi Resconi, Ferrara (IT); Simona Guidotti, Altedo di Malalbergo-Bologna (IT)

(73) Assignee: Basell Polyolefine GmbH, Wesseling (DE)

( * ) Notice: Subject to any disclaimer, the term of this patent is extended or adjusted under 35 U.S.C. 154(b) by 653 days.

(21) Appl. No.: 11/791,253

(22) PCT Filed: Nov. 21, 2005

(86) PCT No.: PCT/EP2005/056121
§ 371 (c)(1),
(2), (4) Date: May 21, 2007

(87) PCT Pub. No.: WO2006/053911
PCT Pub. Date: May 26, 2006

(65) Prior Publication Data
US 2007/0293641 A1    Dec. 20, 2007

Related U.S. Application Data

(60) Provisional application No. 60/631,080, filed on Nov. 23, 2004.

(30) Foreign Application Priority Data

Nov. 22, 2004    (EP) .................................... 04105978

(51) Int. Cl.
| C08F 210/06 | (2006.01) |
| C08F 210/08 | (2006.01) |
| C08F 210/14 | (2006.01) |
| C08F 4/6392 | (2006.01) |
| C08F 4/6592 | (2006.01) |
| B01J 31/22 | (2006.01) |

(52) U.S. Cl. ...... 526/161; 526/160; 526/165; 526/348.2; 526/348.6; 526/943; 502/103; 502/152; 502/155

(58) Field of Classification Search .................. 526/160, 526/161, 165, 384.6, 384.2, 348.6, 943; 502/103, 502/152, 155
See application file for complete search history.

(56) References Cited

U.S. PATENT DOCUMENTS

| 4,288,358 A * | 9/1981 | Trotter et al. ................. 524/474 |
| 5,001,176 A | 3/1991 | Nakazima |
| 5,145,819 A | 9/1992 | Winter et al. |
| 5,239,022 A | 8/1993 | Winter et al. |
| 5,243,001 A | 9/1993 | Winter et al. |
| 5,324,800 A | 6/1994 | Welborn, Jr. et al. |
| 5,556,928 A | 9/1996 | Devore et al. |
| 6,051,728 A | 4/2000 | Resconi et al. |
| 6,444,833 B1 | 9/2002 | Ewen et al. |
| 6,451,724 B1 | 9/2002 | Nifant'ev et al. |
| 6,518,386 B1 | 2/2003 | Resconi et al. |
| 6,559,252 B1 | 5/2003 | Horton et al. |
| 6,583,253 B1 | 6/2003 | Fischer et al. |
| 6,608,224 B2 | 8/2003 | Resconi et al. |
| 6,635,779 B1 | 10/2003 | Ewen et al. |
| 6,841,501 B2 | 1/2005 | Resconi et al. |
| 6,878,786 B2 | 4/2005 | Resconi et al. |
| 6,953,829 B2 | 10/2005 | Kratzer et al. |
| 7,101,940 B2 | 9/2006 | Schottek et al. |
| 7,112,638 B2 | 9/2006 | Nifant'ev et al. |
| 7,141,527 B1 | 11/2006 | Van Baar et al. |
| 7,141,637 B2 | 11/2006 | Elder et al. |
| 2004/0132612 A1 | 7/2004 | Resconi et al. |
| 2005/0192418 A1 | 9/2005 | Ewen et al. |
| 2006/0084769 A1 | 4/2006 | Resconi et al. |
| 2006/0094840 A1 | 5/2006 | Resconi et al. |
| 2006/0235173 A1 | 10/2006 | Resconi |

FOREIGN PATENT DOCUMENTS

| DE | 19962814 | 6/2001 |
| DE | 19962910 | 7/2001 |
| EP | 129368 | 12/1984 |
| EP | 485820 | 5/1992 |
| EP | 485822 | 5/1992 |
| EP | 485823 | 5/1992 |
| WO | 91/02012 | 2/1991 |
| WO | 92/00333 | 1/1992 |
| WO | 96/22995 | 8/1996 |
| WO | 98/22486 | 5/1998 |
| WO | 99/21899 | 5/1999 |
| WO | 99/24446 | 5/1999 |
| WO | 99/58539 | 11/1999 |
| WO | 01/21674 | 3/2001 |
| WO | 01/44318 | 6/2001 |
| WO | 01/47939 | 7/2001 |
| WO | 01/62764 | 8/2001 |
| WO | 02/102811 | 12/2002 |
| WO | 03/045964 | 6/2003 |
| WO | 03/099884 | 12/2003 |
| WO | 2004/005360 | 1/2004 |
| WO | 2004/050713 | 6/2004 |
| WO | 2004/099269 | 11/2004 |
| WO | 2005/095468 | 10/2005 |

OTHER PUBLICATIONS

L. Resconi et al., "Selectivity in Propene Polymerization with Metallocene Catalysts," Chem Rev., vol. 100(4), p. 1253-1345 (2000).

F. Forlini et al., "$^{13}$C NMR studies of zirconocene-catalyzed propylene/1-hexene copolymers: in-depth investigation of the effect of solvent polarity," Macromol. Chem. Phys., vol. 201, p. 401-408 (2000).

H. Cheng, "$^{13}$C NMR Analysis of Propylene-Butylene Copolymers by a Reaction Probability Model," Journal of Polymer Science: Polymer Physics Ed., vol. 21, p. 573-581 (1983).

* cited by examiner

Primary Examiner — Caixia Lu
(74) Attorney, Agent, or Firm — Dilworth IP, LLC

(57) ABSTRACT

A propylene-based terpolymer comprising:
a) from 10.0% by mol to 79.0% by mol of propylene derived units;
b) from 89.5% by mol to 20.5% by mol of 1-butene derived units; and
c) from 0.5% by mol to 15% by mol of derived units of alpha olefin of formula $CH_2=CHZ$ wherein Z is a $C_4$-$C_{20}$ alkyl radical.

7 Claims, No Drawings

PROPYLENE BASED TERPOLYMERS

This application is the U.S. national phase of International Application PCT/EP2005/056121, filed Nov. 21, 2005, claiming priority to European Patent Application 04105978.3 filed Nov. 22, 2004, and the benefit under 35 U.S.C. 119(e) of U.S. Provisional Application No. 60/631,080, filed Nov. 23, 2004; the disclosures of International Application PCT/EP2005/056121, European Patent Application 04105978.3 and U.S. Provisional Application No. 60/631,080, each as filed, are incorporated herein by reference.

The present invention relates to terpolymers comprising derived units from propylene, 1-butene and a higher alpha olefin of formula $CH_2=CHZ$ wherein Z is a $C_4$-$C_{20}$ alkyl radical. The present invention further relates to a process for the preparation of said terpolymers. Said process being carried out in solution by using a metallocene-based catalyst system and a mixture of the monomers as reaction medium.

WO 03/099884 relates to a terpolymer including at least propylene as first monomeric component, 1-pentene as a second monomeric component and as third component, a third olefin having less than 5 carbon atoms and being linear or having 5 carbon atom and being branched otherwise having more than 5 carbon atoms. According to the description the reported terpolymer can be obtained by using both titanium-based catalyst systems (Ziegler-Natta catalyst) or metallocene-based catalyst systems. However in the examples only titanium-based catalyst system are exemplified. The terpolymer has to contain 1-pentene while in the terpolymer of the present invention 1-pentene derived units are excluded.

U.S. Pat. No. 5,001,176 cites a propylene-hexene-butene-1 terpolymer having a propylene unit content of 70% or higher. However no enabling description is given in the document for preparing such a terpolymer, neither a further indication about the other comonomers content.

U.S. Pat. No. 6,583,253 relates to a propylene terpolymer consisting of from 80 to 99.5% by mol of propylene derived units. The terpolymer is obtained by using a metallocene-based catalyst system in slurry. The terpolymers described in this document have a lower melting point with respect to a propylene copolymer having the same content of comonomer. This effect is confirmed in the examples of the document. On the contrary the applicant unexpectedly found that when the propylene content is lower than 80% by mol the resulting melting point of the terpolymer is higher than the corresponding copolymer having the same content of monomers.

Therefore the applicant unexpectedly found a new propylene based terpolymer being flexible and soft, that can be used for applications in compounding, i.e. as part of a blend with other polymers for applications such as films and mouldings.

An object of the present invention is a propylene-based terpolymer comprising:
a) from 10.0% by mol to 79.0% by mol of propylene derived units;
b) from 89.5% by mol to 20.5% by mol of 1-butene derived units; and
c) from 0.5% by mol to 15% by mol of derived units of alpha olefin of formula $CH_2=CHZ$ wherein Z is a $C_4$-$C_{20}$ alkyl radical.

The propylene-based terpolymer, object of the present invention, has preferably a distribution of molecular weight Mw/Mn lower than 4; more preferably lower than 3.5; even more preferably lower than 3.

The intrinsic viscosity (II) of the propylene-based terpolymer object of the present invention measured in tetrahydronapthalene (THN) at 135° C. is preferably higher than 0.8 dL/g; more preferably the intrinsic viscosity is higher than 1 dL/g; even more preferably the intrinsic viscosity is higher than 1.3 dL/g; still more preferably the intrinsic viscosity is higher than 1.5 dL/g.

Preferably the propylene-based terpolymer object of the present invention comprises:
a) from 10.0% by mol to 77.0% by mol of propylene derived units;
b) from 89.0% by mol to 22.0% by mol of 1-butene derived units; and
c) from 1% by mol to 15% by mol of derived units of alpha olefin of formula $CH_2=CHZ$ wherein Z is a $C_4$-$C_{20}$ alkyl radical.

More preferably the propylene-based terpolymer object of the present invention comprises:
a) from 20.0% by mol to 76.0% by mol of propylene derived units;
b) from 68.0% by mol to 22.0% by mol of 1-butene derived units; and
c) from 2% by mol to 13% by mol of derived units of alpha olefin of formula $CH_2=CHZ$ wherein Z is a $C_4$-$C_{20}$ alkyl radical.

Even more preferably the propylene-based terpolymer object of the present invention comprises:
a) from 30.0% by mol to 76.0% by mol of propylene derived units;
b) from 67.0% by mol to 22.0% by mol of 1-butene derived units; and
c) from 3% by mol to 12% by mol of derived units of alpha olefin of formula $CH_2=CHZ$ wherein Z is a $C_4$-$C_{20}$ alkyl radical.

A further advantage of the propylene-based terpolymer object of the present invention is that they can be obtained by using a solution polymerization even at high content of propylene derived units. This allows to eliminate the problems of fouling that usually occurs when such a soft polymer is obtained in a gas phase or in a slurry, because of the stickiness of the latter.

For the purpose of the present invention the term solution polymerization means that the polymer is completely soluble in the polymerization medium.

The propylene-based terpolymer object of the present invention is preferably obtained by using a metallocene-based catalyst system. Therefore a further object of the present invention is a process for obtaining the propylene-based terpolymer object of the present invention comprising contacting under polymerization conditions propylene, 1-butene and an alpha olefin of formula $CH_2=CHZ$ wherein Z is a $C_4$-$C_{20}$ alkyl radical in the presence of a catalyst system obtainable by contacting:
a) at least one metallocene compound;
b) an alumoxane or a compound capable of forming an alkyl metallocene cation; and optionally
c) an organo aluminum compound.

For the purpose of the present invention metallocene compounds are compounds containing at least a cyclopentadienyl skeleton bound through a n-bond to a central metal atom belonging to group 4, 5 or to the lanthanide or actinide groups of the Periodic Table of the Elements; preferably the central metal atom is zirconium, titanium or hafnium. Preferably the metallocene compounds have $C_1$ or $C_2$ or $C_2$-like symmetry.

Preferably the process according to the present invention is carried out in solution. For the purpose of the present invention the term solution polymerization means that the polymer is completely soluble in the polymerization medium.

The polymerization medium comprises a mixture of monomers and optionally an organic aliphatic solvent, such as hexane, cyclohexane, isododecane or a mixture of various solvents such as that one sold under the trademark ISOPAR®.

Preferably in the process according to the present invention the polymerization medium consists of a mixture of 1-butene, propylene and said alpha olefin of formula $CH_2=CHZ$. The use of a mixture of monomers as reaction medium allows to avoid the use of solvent and therefore the step of the removal of the latter, so that the industrial process is easier to carry out and less expensive. In addition avoiding the use of a solvent makes the polymer more suitable for food contact use.

Preferably the polymerization temperature ranges from 50° C. to 90° C.; more preferably it ranges from 60° C. to 80° C. This polymerization temperature range allows an optimum balance between the activity of the metallocene-based catalyst and the solubility of the polymer.

Preferably the metallocene based catalyst system is not supported on an inert carrier, this allows to increase the activity of the catalyst system, since supported metallocene-based catalyst systems have lower activity than unsupported ones. Preferably the catalyst system is in the form of catalytic solution, the catalytic solution can be obtained, for example by solubilizing the reaction product of the metallocene compound a) and an alumoxane or a compound capable of forming an alkyl metallocene cation; b) in an aliphatic or aromatic solvent such as toluene, hexane, cyclohexane or isododecane. An advantageous catalytic solution can be obtained according to a process comprising the following steps:

a) contacting a solution of methylalumoxane (MAO) in an aromatic solvent (solvent a) with a solution in a solvent (solvent b) of one or more alumoxanes different from methylalumoxane or one or more organo-aluminium compound of formula $H_jAlU_{3-j}$ or $H_jAl_2U_{6-j}$, where the U substituents, same or different, are hydrogen atoms, halogen atoms, or hydrocarbon group containing from 2 to 20 carbon atoms, optionally containing silicon or germanium atoms, with the proviso that at least one U is different from halogen and from hydrogen, and j ranges from 0 to 1, being also a non-integer number;

(b) when solvent b) is an aromatic solvent or solvent b) has a boiling point lower than solvent a) adding to the solution formed in step a) an alifatic solvent (solvent c) having a boiling point higher than solvent a) and solvent b);

(c) solubilizing a metallocene compound in the solution obtained in step a) or in step b); and (d) substantially removing the aromatic solvent(s) (solvent a) or solvent a) and solvent b) (if step b) has been carried out) from the solution.

wherein the content of the aromatic solvent(s) in the solution obtained in step d) is lower than 2% by weight; preferably equal to or lower than 1% by weight; the molar concentration of the metallocene compound in the final solution obtained in step d) ranges from $1 \cdot 10^{-5}$ to $1 \cdot 10^{-1}$ mol/l, and the molar ratio between methylalumoxane and the organo-aluminium compound or the molar ratio between methylalumoxane and the alumoxane used in step b) ranges from 10:1 to 1:10; preferably it ranges from 5:1 to 1:5; more preferably from 3:1 to 1:3.

Processes of this type are described in EP 04101020.8.

For the purpose of the present invention metallocene compounds are compounds containing at least a cyclopentadienyl skeleton bound through a n-bond to a central metal atom belonging to group 4, 5 or to the lanthanide or actinide groups of the Periodic Table of the Elements; preferably the central metal atom is zirconium, or hafnium.

A preferred class of metallocene compounds have the following formula (I).

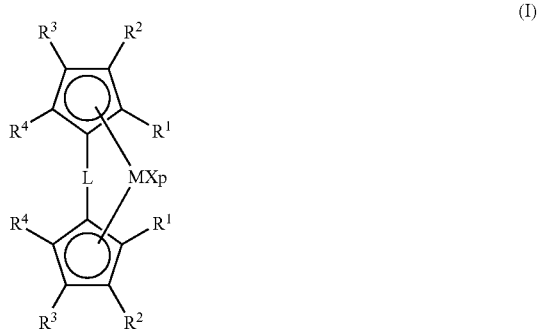

wherein:
the compounds of formula (I) have $C_1$ or $C_2$ or $C_2$-like symmetry;
M is a transition metal belonging to group 4 of the Periodic Table of the Elements; preferably M is zirconium, or hafnium;
the substituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl group, optionally containing one or more Si or Ge atoms; the substituents X are preferably the same and are preferably hydrogen, halogen, $R^1$ or $OR^6$; wherein $R^6$ is preferably a $C_1$-$C_7$ alkyl, $C_6$-$C_{14}$ aryl or $C_7$-$C_{14}$ arylalkyl group, optionally containing one or more Si or Ge atoms; more preferably, the substituents X are Cl or Me.
p is an integer equal to the oxidation state of the metal M minus 2; preferably p is 2;
L is a divalent bridging group selected from $C_1$-$C_{20}$ alkylidene, $C_3$-$C_{20}$ cycloalkylidene, $C_6$-$C_{20}$ arylidene, $C_7$-$C_{20}$ alkylarylidene, or $C_7$-$C_{20}$ arylalkylidene radicals optionally containing heteroatoms belonging to groups 13-17 of the Periodic Table of the Elements, and silylidene radical containing up to 5 silicon atoms such as $SiMe_2$, $SiPh_2$; preferably L is a divalent group $(ZR^7_m)_n$; Z being C, Si, Ge, N or P, and the $R^7$ groups, equal to or different from each other, being hydrogen or linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl groups or two $R^7$ can form a alifatic or aromatic $C_4$-$C_7$ ring;
more preferably L is selected from $Si(CH_3)_2$, $SiPh_2$, $SiPhMe$, $SiMe(SiMe_3)$, $CH_2$, $(CH_2)_2$, $(CH_2)_3$ or $C(CH_3)_2$;
$R^1$, $R^2$, $R^3$, and $R^4$, equal to or different from each other, are hydrogen atoms, or linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl, or $C_7$-$C_{20}$-arylalkyl radicals, optionally containing one or more heteroatoms belonging to groups 13-17 of the Periodic Table of the Elements; or two adjacent $R^1$, $R^2$, $R^3$ and $R^4$ form one or more 3-7 membered ring optional containing heteroatoms belonging to groups 13-17 of the periodic table; such as to form with the cyclopentadienyl moiety the following radicals: indenyl; mono-, di-, tri- and tetra-methyl indenyl; 2-methyl indenyl, 3-'butyl-indenyl, 2-isopropyli-4-phenyl indenyl, 2-methyl-4-phenyl indenyl, 2-methyl-4,5 benzo indenyl; 3-trimethylsilyl-indenyl; 4,5,6,7-tetrahydroindenyl; fluorenyl; 5,10-dihydroindeno[1,2-b]indol-10-yl; N-methyl- or N-phenyl-5,10-dihydroindeno[1,2-b]indol-10-yl; 5,6-dihydroindeno[2,1-b]indol-6-yl; N-methyl- or N-phenyl-5,6- dihydroindeno[2,1-b]indol-6-yl; azapentalene-4-yl; thiapentalene-4-yl; azapentalene-6-yl; thiapentalene-6-yl; mono-, di- and tri-methyl-azapentalene-4-yl, 2,5-dimethyl-cyclopenta[1,2-b:4,3-b']-dithiophene.

Non limiting examples of compounds belonging to formula (I) are the following compounds:
dimethylsilanediylbis(indenyl)zirconium dichloride,
dimethylsilanediylbis(2-methyl-4-phenylindenyl)zirconium dichloride,
dimethylsilanediylbis(2-methyl-4-naphthylindenyl)zirconium dichloride,
dimethylsilanediylbis(2-methylindenyl)zirconium dichloride,
dimethylsilanediylbis(2-methyl-4-isopropylindenyl)zirconium dichloride,
dimethylsilanediylbis(2,4-dimethylindenyl)zirconium dichloride,
dimethylsilanediylbis(2-methyl-4,5-benzoindenyl)zirconium dichloride,
dimethylsilanediylbis(2,4,7-trimethylindenyl)zirconium dichloride,
dimethylsilanediylbis(2,4,6-trimethylindenyl)zirconium dichloride,
dimethylsilanediylbis(2,5,6-trimethylindenyl)zirconium dichloride,
dimethylsilanediylbis(2-isopropyl-4-(4'-tert-butyl)-phenyIndenyl)(2,7-Methyl-4-(4'-tert-butyl)-Phenyl-Indenyl)-zirconium dichloride,
dimethylsilanediylbis(2-isopropyl-4-(4'-tert-butyl)-phenyIndenyl)(2-Methyl-4-(4'-tert-butyl)-Phenyl-Indenyl)-zirconium dichloride,
dimethylsilanediylbis(2-isopropyl-4-phenyl-Indenyl)(2-Methyl-4-Phenyl-Indenyl)-zirconium dichloride,
methyl(phenyl)silanediylbis(2-methyl-4,6-diisopropylindenyl)-zirconium dichloride,
methyl(phenyl)silanediylbis(2-methyl-4-isopropylindenyl)-zirconium dichloride,
1,2-ethylenebis(indenyl)zirconium dichloride,
1,2-ethylenebis(4,7-dimethylindenyl)zirconium dichloride,
1,2-ethylenebis(2-methyl-4-phenylindenyl)zirconium dichloride,
1,2-ethylenebis(2-methyl-4,6-diisopropylindenyl)zirconium dichloride,
1,2-ethylenebis(2-methyl-4,5-benzoindenyl)zirconium dichloride,
dimethylsilanediyl(3-tert-butyl-cyclopentadienyl)(9-fluorenyl)zirconium dichloride,
dimethylsilandiylbis-6-(3-methylcyclopentadienyl-[1,2-b]-thiophene) dichloride;
dimethylsilandiylbis-6-(4-methylcyclopentadienyl-[1,2-b]-thiophene)zirconium dichloride;
dimethylsilandiylbis-6-(4-isopropylcyclopentadienyl-[1,2-b]-thiophene)zirconium dichloride;
dimethylsilandiylbis-6-(4-ter-butylcyclopentadienyl-[1,2-b]-thiophene)zirconium dichloride;
dimethylsilandiylbis-6-(3-isopropylcyclopentadienyl-[1,2-b]-thiophene)zirconium dichloride;
dimethylsilandiylbis-6-(3-phenylcyclopentadienyl-[1,2-b]-thiophene)zirconium dichloride;
dimethylsilandiylbis-6-(2,5-dimethyl-3-phenylcyclopentadienyl-[1,2-b]-thiophene)zirconium dimethyl;
dimethylsilandiylbis-6-[2,5-dimethyl-3-(2-methylphenyl)cyclopentadienyl-[1,2-b]-thiophene]zirconium dichloride;
dimethylsilandiylbis-6-[2,5-dimethyl-3-(2,4,6-trimethylphenyl)cyclopentadienyl-[1,2-b]-thiophene]zirconium dichloride;
dimethylsilandiylbis-6-[2,5-dimethyl-3-mesitylenecyclopentadienyl-[1,2-b]-thiophene]zirconium dichloride;
dimethylsilandiylbis-6-(2,4,5-trimethyl-3-phenylcyclopentadienyl-[1,2-b]-thiophene)zirconium dichloride;
dimethylsilandiylbis-6-(2,5-diethyl-3-phenylcyclopentadienyl-[1,2-b]-thiophene)zirconium dichloride;
dimethylsilandiylbis-6-(2,5-diisopropyl-3-phenylcyclopentadienyl-[1,2-b]-thiophene)zirconium dichloride;
dimethylsilandiylbis-6-(2,5-diter-butyl-3-phenylcyclopentadienyl-[1,2-b]-thiophene)zirconium dichloride;
dimethylsilandiylbis-6-(2,5-ditrimethylsilyl-3-phenylcyclopentadienyl-[1,2-b]-thiophene)zirconium dichloride;
dimethylsilyl{(2-methyl-1-indenyl)-7-(2,5-dimethyl-cyclopenta[1,2-b:4,3-b']-dithiophene)}zirconium dichloride
dimethylsilyl{(2,4,7-trimethyl-1-indenyl)-7-(2,5-dimethylcyclopenta[1,2-b:4,3-b']-dithiophene)}zirconium dichloride
dimethylsilyl{(2,4,6-trimethyl-1-indenyl)-7-(2,5-dimethylcyclopenta[1,2-b:4,3-b']-dithiophene)}zirconium dichloride as well as the corresponding dimethyl, chloromethyl, dihydro and $\eta^4$butadiene compounds. The terms $C_1$ and $C_2$ symmetry are described in Chem. Rev. 2000, 100, 1253-1345. For the purpose of the present invention the term $C_2$-like means that the bulkier substituents of the two cyclopentadienyl moieties on the metallocene compound are on the opposite side with respect to the plane containing the zirconium and the centre of the said cyclopentadienyl moieties as shown in the following compound:

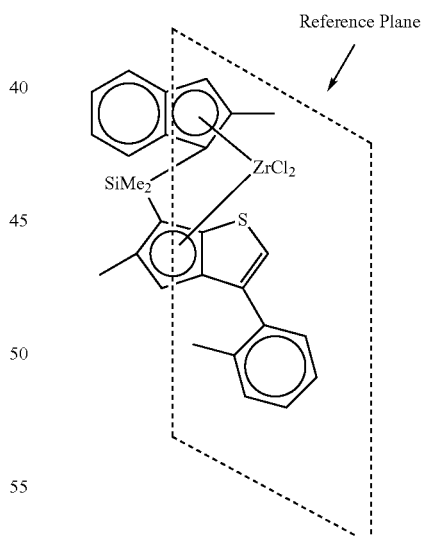

Suitable metallocene complexes belonging to formula (I) are described in WO 98/22486, WO 99/58539 WO 99/24446, U.S. Pat. No. 5,556,928, WO 96/22995, EP485822, EP485820, U.S. Pat. No. 5,324,800, EP-A-0 129 368, U.S. Pat. No. 5,145,819, EP-A-0 485 823, WO 01/47939, WO 01/44318 and PCT/EP02/13552.

Preferred metallocene compounds to be used in the process according to the present invention have formula (II) and (III)

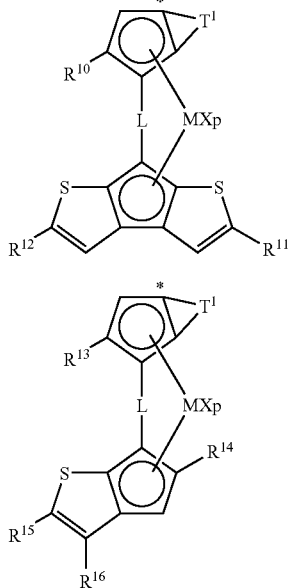

wherein M, X, p, and L are described above;

in the compound of formula (II):

$R^{10}$ is a hydrogen atom, or a $C_1$-$C_{40}$ hydrocarbon radicals optionally containing heteroatoms belonging to groups 13-17 of the Periodic Table of the Elements; Preferably $R^{10}$ is a hydrogen atom or a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^{10}$ is linear or branched, saturated or unsaturated $C_1$-$C_{20}$-alkyl radicals, optionally containing heteroatoms belonging to groups 13-17 of the Periodic Table of the Elements; even more preferably $R^1$ is a $C_1$-$C_{10}$-alkyl radical such as a methyl, or ethyl radical;

$R^{11}$ and $R^{12}$, equal to or different from each other, are hydrogen atoms or $C_1$-$C_{40}$ hydrocarbon radicals optionally containing heteroatoms belonging to groups 13-17 of the Periodic Table of the Elements; preferably $R^{11}$ and $R^{12}$ are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^{11}$ and $R^{12}$ are linear or branched, $C_1$-$C_{20}$-alkyl radicals, such as methyl or ethyl radicals; $T^1$ is a moiety of formula (IIa) or (IIb):

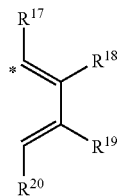

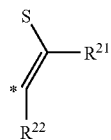

wherein the atom marked with the symbol * bonds the atom marked with the same symbol in the compound of formula (II);

$R^{17}$, $R^{18}$, $R^{19}$ and $R^{20}$, equal to or different from each other, are hydrogen atoms, or $C_1$-$C_{40}$ hydrocarbon radicals optionally containing heteroatoms belonging to groups 13-17 of the Periodic Table of the Elements; or two adjacent $R^{17}$, $R^{18}$, $R^{19}$ and $R^{20}$ can optionally form a saturated or unsaturated, 5 or 6 membered rings, said ring can bear $C_1$-$C_{20}$ alkyl radicals as substituents; Preferably $R^{17}$, $R^{18}$, $R^{19}$ and $R^{20}$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements;

$R^{17}$ is preferably a linear or branched, saturated or unsaturated $C_1$-$C_{20}$-alkyl radical, optionally containing heteroatoms belonging to groups 13-17 of the Periodic Table of the Elements; more preferably $R^{17}$ is a $C_1$-$C_{10}$-alkyl radical; even preferably $R^{17}$ is a methyl, ethyl or isopropyl radical;

$R^{19}$ is preferably a hydrogen atom or a $C_1$-$C_{10}$-alkyl radical such as a methyl, ethyl or isopropyl radical;

$R^{20}$ is preferably a hydrogen atom or linear or branched, saturated or unsaturated $C_1$-$C_{20}$-alkyl radical, optionally containing heteroatoms belonging to groups 13-17 of the Periodic Table of the Elements; preferably a $C_1$-$C_{10}$-alkyl radical; even preferably $R^{20}$ is a methyl or ethyl radical;

$R^{21}$ and $R^{22}$, equal to or different from each other, are hydrogen atoms or $C_1$-$C_{40}$ hydrocarbon radicals optionally containing heteroatoms belonging to groups 13-17 of the Periodic Table of the Elements; preferably $R^{21}$ and $R^{22}$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements;

more preferably $R^{21}$ is a hydrogen atom or a linear or branched, cyclic or acyclic $C_1$-$C_{20}$-alkyl radical; even more preferably $R^{21}$ is a methyl or ethyl radical; preferably $R^{22}$ is a $C_1$-$C_4\alpha$-alkyl, $C_6$-$C_{40}$-aryl or a $C_7$-$C_{40}$-arylalkyl radical; more preferably $R^{22}$ is a moiety of formula (IV)

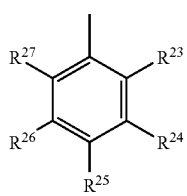

wherein $R^{23}$, $R^{24}$, $R^{25}$, $R^{26}$ and $R^{27}$, equal to or different from each other, are hydrogen atoms or $C_1$-$C_{20}$ hydrocarbon radicals; preferably $R^{23}$, $R^{24}$, $R^{25}$, $R^{26}$ and $R^{27}$ are hydrogen atoms or linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals; more preferably $R^{23}$, and $R^{26}$ are a hydrogen atoms; $R^{24}$, $R^{25}$ and $R^{26}$ are more preferably hydrogen atoms or linear or branched, cyclic or acyclic, $C_1$-$C_{10}$-alkyl radicals;

in the compound of formula (III):

$R^{13}$ and $R^{14}$, equal to or different from each other, are a hydrogen atoms, or $C_1$-$C_{40}$ hydrocarbon radicals optionally containing heteroatoms belonging to groups 13-17 of the Periodic Table of the Elements; preferably $R^{13}$ and $R^{14}$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^{13}$ and $R^{14}$ are linear or branched, saturated or unsaturated $C_1$-$C_{20}$-alkyl radicals, optionally containing heteroatoms belonging to groups 13-17 of the Periodic Table of the Elements; such as a methyl, an ethyl or an isopropyl radical;

$R^{15}$ and $R^{16}$, equal to or different from each other, are hydrogen atoms or $C_1$-$C_{40}$ hydrocarbon radicals optionally containing heteroatoms belonging to groups 13-17 of the Periodic Table of the Elements; preferably $R^{15}$ and $R^{16}$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements;

preferably $R^{15}$ is a hydrogen atom or a linear or branched, cyclic or acyclic $C_1$-$C_{20}$-alkyl radical; more preferably $R^{15}$ is a methyl or ethyl radical;

preferably $R^{16}$ is a $C_1$-$C_4\alpha$-alkyl, $C_6$-$C_{40}$-aryl or a $C_7$-$C_{40}$-arylalkyl; more preferably $R^{16}$ is a moiety of formula (IV)

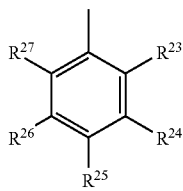

(IV)

wherein $R^{23}$, $R^{24}$, $R^{25}$, $R^{26}$ and $R^{27}$, equal to or different from each other, are hydrogen atoms or $C_1$-$C_{20}$ hydrocarbon radicals; preferably $R^{23}$, $R^{24}$, $R^{25}$, $R^{26}$ and $R^{27}$ are hydrogen atoms or linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals; preferably $R^{23}$, and $R^{26}$ are a hydrogen atoms; $R^{24}$, $R^{25}$ and $R^{26}$ are preferably hydrogen atoms or linear or branched, cyclic or acyclic, $C_1$-$C_{10}$-alkyl radicals;

$T^1$ has the same meaning described above.

Alumoxanes used as component b) can be obtained by reacting water with an organo-aluminium compound of formula $H_jAlU_{3-j}$ or $H_jAl_2U_{6-j}$, where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number. In this reaction the molar ratio of Al/water is preferably comprised between 1:1 and 100:1.

The alumoxanes used in the process according to the invention are considered to be linear, branched or cyclic compounds containing at least one group of the type:

wherein the substituents U, same or different, are defined above.

In particular, alumoxanes of the formula:

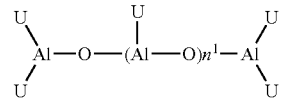

can be used in the case of linear compounds, wherein $n^1$ is 0 or an integer of from 1 to 40 and the substituents U are defined as above; or alumoxanes of the formula:

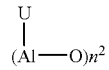

can be used in the case of cyclic compounds, wherein n2 is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns.

Non-limiting examples of aluminium compounds that can be reacted with water to give suitable alumoxanes (b), described in WO 99/21899 and WO01/21674, are: tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluoro-phenyl)-propyl]aluminium, tris[2-(4-chloro-phenyl)-propyl]aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl] aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBA), tris(2,4,4-trimethyl-pentyl)aluminium (TIOA), tris(2,3-dimethylbutyl) aluminium (TDMBA) and tris(2,3,3-trimethylbutyl) aluminium (TIMBA) are preferred.

Non-limiting examples of compounds able to form an alkylmetallocene cation are compounds of formula $D^+E^-$, wherein $D^+$ is a BrIIonsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be removed by an olefinic monomer. Preferably, the anion $E^-$ comprises one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkylmetallocene cation are compounds of formula $BAr_3P$ wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Tributylammoniumtetra(pentafluorophenyl)aluminate,
Tributylammoniumtetra(trifluoromethylphenyl)borate,
Tributylammoniumtetra(4-fluorophenyl)borate,
N,N-Dimethylbenzylammonium-tetrakispentafluorophenylborate,
N,N-Dimethylhexylamonium-tetrakispentafluorophenylborate,
N,N-Dimethylaniliniumtetrakis(pentafluorophenyl)borate,
N,N-Dimethylaniliniumtetrakis(pentafluorophenyl)aluminate,
N,N-Dimethylbenzylammonium-tetrakispentafluorophenylborate,
N,N-Dimethylhexylamonium-tetrakispentafluorophenylborate,
Di(propyl)ammoniumtetrakis(pentafluorophenyl)borate,
Di(cyclohexyl)ammoniumtetrakis(pentafluorophenyl)borate,
Triphenylcarbeniumtetrakis(pentafluorophenyl)borate,
Triphenylcarbeniumtetrakis(pentafluorophenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate, and N,N-Dimethylaniliniumtetrakis(pentafluorophenyl)borate.

Additional examples of compounds of formula $D^+E^-$ that can be used according to the present invention are described in WO 04/005360, WO 02/102811 and WO 01/62764. Organic aluminum compounds used as compound III) are those of formula $H_jAlU_{3-j}$ or $H_jAl_2U_{6-j}$ as described above.

The molecular weight distribution can be varied by using mixtures of different metallocene compounds or by carrying out the polymerization in several stages which differ as to the polymerization temperature and/or the concentrations of the molecular weight regulators and/or the monomers concentration. Moreover by carrying out the polymerization process by using a combination of two different metallocene compounds of formula (I) a polymer endowed with a broad melting is produced.

A further advantage of the process of the present invention is that by using a mixtures of comonomers as reaction medium it is possible to increase the activity of the catalyst system, i.e. there is a strong activating effect due to the high concentration of propylene.

The propylene-based terpolymer object of the present invention comprises derived units of propylene, 1-butene and alpha olefin of formula $CH_2=CHZ$ wherein Z is a $C_4$-$C_{20}$ alkyl radical; preferably Z is a $C_1$-$C_{20}$ linear alkyl radical. Examples of alpha olefin of formula $CH_2=CHZ$ are 1-hexene, 1-heptene, 1-octene, 1-dodecene, 4-methyl-1-pentene. 1-hexene and 1-octene are preferably used.

The obtained terpolymers show plastomeric properties and they have an optimum balance of properties, in particular the tensile modulus is very low if compared with the correspondent propylene/1-butene copolymer having the same content of propylene, while the melting point is higher. For the correspondent propylene/1-butene copolymer it is meant that the amount of 1-butene derived unit in the copolymer is equal to the amount of the 1-butene derived unit plus the amount of the derived units of alpha olefin in the terpolymer, the amount of propylene derived unit being the same.

The propylene-based terpolymer object of the present invention comprising:
a) from 10.0% by mol to 77.0% by mol of propylene derived units;
b) from 89.0% by mol to 22.0% by mol of 1-butene derived units; and
c) from 1% by mol to 15% by mol of derived units of alpha olefin of formula $CH_2=CHZ$ wherein Z is a $C_4$-$C_{20}$ alkyl radical;
has a melting point higher than the corresponding propylene/1-butene copolymer having the same content of propylene derived units.

The following examples are give in order to illustrate the invention all the modifications in order to carry out the invention in the whole range described are obvious in view of the general knowledge of the skilled man.

EXAMPLES

All chemicals must be handled using standard Schlenk techniques.

Methylalumoxane (MAO) was received from Albemarle as a 30% wt/wt. toluene solution and used as such.

Pure triisobutylaluminum (TIBA) was used as such.

Isododecane was purified over alumina to reach a water content below 10 ppm. A 110 g/L TIBA/isododecane solution was obtained by mixing the above components.
Polymer Analysis I.V. Intrinsic viscosities were measured in THN (tetrahydronapthalene at 135° C.)
Gel Permeation Chromatography (GPC) Analysis High-temperature GPC analyses were carried out using a Waters 150 CV instrument. A single solution of each sample was prepared by adding 15 ml of solvent to ca. 30 mg of sample and refluxing gently for 20 minutes. The solutions were then filtered through a fibre pad at 140° C. and part of each filtered solution transferred into special glass sample vials. The vials were then placed in a heated sample compartment and after an initial delay of 20 minutes to allow the samples to equilibrate thermally, injection of part of the contents of each vial was carried out automatically in series.

The following chromatographic conditions were used:

| | |
|---|---|
| Column: | PLgel 2 x mixed bed-B, 30 cm, 10 microns |
| Solvent: | 1,2-dichlorobenzene with antioxidant |
| Flow rate: | 1.0 ml/minutes |
| Temperature: | 140° C. |
| Detector: | refractive index |
| Calibration: | polystyrene |

DSC. The melting points of the polymers ($T_m$) were measured by Differential Scanning Calorimetry (DSC) on a Perkin Elmer DSC-7 calorimeter equipped with Pyris I software, in the Solid State Properties (FE-PPC) laboratory, previously calibrated at indium and zinc melting points with particular attention in determining the baseline with required accuracy. The preparation of the samples, for calorimetric investigations, has been performed by cutting them into small pieces by using a cutter. The weight of the samples in every DSC crucible was kept at 6.0±0.5 mg.

The weighted sample was sealed into aluminum pans and heated to 180° C. at 10° C./minute. The sample was kept at 180° C. for 5 minutes to allow a complete melting of all the crystallites, then cooled to 20° C. at 10° C./minute. After standing 2 minutes at 20° C., the sample was heated for the second time to 180° C. at 10° C./min. In this second heating run, the peak temperature was taken as the melting temperature ($T_m$) and the area of the peak as its melting enthalpy ($\Delta H_f$).

Mechanical Test

All specimens for mechanical testing were cut from compression moulding plaques. The tensile modulus was measured accordingly to ISO527-1 on a 2 mm thick plate, tensile properties and Tg (tan δ) are obtained via DMTA measurements accordingly to ASTM 5026, 4092 and 4065. The specimen size for DMTA test is approx. 40 mm long overall, 20 mm inter-clamp length, 6 mm width and thickness was 1 mm. Specimen is clamped in the SEIKO DMS 6100 tensile DMTA. The applied frequency is 1 Hz. Specimens are heated from −80° C. to +140° C. with 2° C./min as heating rate; specimens are re-clamped at the low temperature.

Compression set have been measured according to ASTM D395B type 1.

Shore Hardness D was measured according to ISO 868.

NMR analysis. $^{13}$C-NMR spectra were acquired on a DPX-400 spectrometer operating at 100.61 MHz in the Fourier transform mode at 120° C. The peak of the isotactic PPPPP methyl was used as internal reference at 21.8. The samples were dissolved in 1,1,2,2-tetrachloroethane-$d_2$ at 120° C. with a 8% wt/v concentration. Each spectrum was acquired with a 90° pulse, 15 seconds of delay between pulses and CPD (waltz16) to remove $^1$H-$^{13}$C coupling. About 1000-1500 transients were stored in 32 K data points using a spectral window of 6000 Hz.

Assignments reported in the following table were made with reference to $C_3C_4$, $C_4C_6$ and $C_3C_6$ copolymers according to F. Forlini, I. Tritto, P. Locatelli, M. C. Sacchi, F. Piemontesi, Macromol. Chem. Phys., 201, 401-408 (2000) and H. N. Cheng, Journal of Polymer Science, Polymer Physics Edition, 21, 573 (1983).

| Number | Chemical Shift (ppm) | Carbon | Sequence |
|---|---|---|---|
| 1 | 46.97 | Sαα $CH_2$ | HPPH |
| 2 | 46.67 | Sαα $CH_2$ | HPPP |
| 3 | 46.39 | Sαα $CH_2$ | PPPP |
| 4 | 44.07 | Sαα $CH_2$ | HHPH + PHPH |
| 5 | 43.79 | Sαα $CH_2$ | HHPP + PHPP |
| 6 | 43.51 | Sαα $CH_2$ | BBPB + PBPB |
| 7 | 43.23 | Sαα $CH_2$ | BBPP + PBPP |
| 8 | 41.27 | Sαα $CH_2$ | HH |
| 9 | 40.68 | Sαα $CH_2$ | HB |
| 10 | 40.10 | Sαα $CH_2$ | BB |
| 11 | 35.57-35.20 | α$CH_2$ | H |
| 12 | 35.13-34.88 | CH | B |
| 13 | 33.65 | CH | H |
| 14 | 29.24-29.04 | β $CH_2$ | H |
| 15 | 28.94-28.36 | CH | P |
| 16 | 28.16-28.01 | α$CH_2$ | PBP |
| 17 | 28.01-27.81 | α$CH_2$ | PBB |
| 18 | 27.81-27.65 | α$CH_2$ | BBB |
| 19 | 23.30 | γ$CH_2$ | H |
| 20 | 21.80-19.87 | $CH_3$ | P |
| 21 | 14.13 | CH | H |
| 22 | 14.01-10.79 | CH | B |

Dyad distribution was obtained from Sαα carbons as:

$PP=I_1+I_2+I_3$ $PB=I_6+I_7$ $BB=I_{10}$ $PH=I_4+I_5$ $BH=I_9$ $HH=I_8$

Composition was obtained from dyads using the following relations:

$P(m\%)=PP+0.5(PH+PB)$ $B(m\%)=BB+0.5(BH+PB)$ $H(m\%)=HH+0.5(PH+P)H$

Metallocene Compounds

Dimethylsilyl{(2,4,7-trimethyl-1-indenyl)-7-(2,5-dimethyl-cyclopenta[1,2-b:4,3-b']-dithiophene)}zirconium dimethyl (A-1) was prepared according to the procedure described in EP 04101020.8.

Preparation of the Catalyst System C-1

In a 20 Lt. jacketed reactor were charged at room temperature under nitrogen atmosphere 2390 g of a 110 g/Lt. TIBA solution in isododecane (3.11 L) and 800 mL of a 30% wt./wt. MAO solution in toluene The resulting alkyl mixture was stirred at 50° C. for 1 h. Then 7.09 g of A-1 (13.1 mmol) were suspended at room temperature in 500 g of isododecane and charged under nitrogen atmosphere into the reactor. After 1 h stirring at 50° C., the reaction mixture was diluted with 0.52 Lt. (702 g) of isododecane to reach a concentration of total catalyst (A-1 plus MAO plus TIBA) of 100 g each Lt. of solution. The resulting catalyst solution was discharged from the reactor and used as such. This catalyst solution was analysed and it resulted: $Al_{TOT}/Zr=429$ (theoretical value 396), Al=3.35% wt. (theoretical value 3.32), Zr=264 ppm (theoretical value 283). The concentration of the metallocene resulted to be 1.28 mg of A-1 for each mL of solution. The catalyst solution resulted composed of toluene=10.90% wt., isododecane=76.14% wt., MAO=4.67% wt., TIBA=8.11% wt. and metallocene A-1=0.17% wt. Polymerization general procedure 6 mmol of Al(i-Bu)$_3$ (as a 1 M solution in hexane) and the amounts of 1-butene, propylene and 1-hexene listed in Table 1 were charged at room temperature in a 4 L jacketed stainless-steel autoclave, equipped with magnetically driven stirrer and a 35-mL stainless-steel vial, connected to a thermostat for temperature control, previously purified by washing with an Al(i-Bu)$_3$ solution in hexane and dried at 50° C. in a stream of nitrogen. No further monomers were fed during the polymerization. The autoclave was then thermostated at the polymerization temperature (70° C.), and then 1 mL of the solution containing the catalyst/cocatalyst mixture prepared above was injected in the autoclave by means of nitrogen pressure through the stainless-steel vial, and the polymerization carried out at constant temperature for 1 h. Then stirring is interrupted; the pressure into the autoclave is increased with nitrogen. The bottom discharge valve is opened and the monomers/copolymer mixture is discharged into a heated steel tank containing water at 70° C. The tank heating is switched off and a flow of nitrogen at 0.5 bar-g is fed. After cooling at room temperature, the steel tank is opened and the wet polymer collected. The wet polymer is dried in an oven under reduced pressure at 70° C. The polymerization conditions and the characterizations of the polymer obtained are reported in tables 1 and 2.

TABLE 1

| EX | Met | mg of metallocene | C3, g total fed | C4, g total fed | C6, g total | C3, g liquid phase | C4, g liquid phase |
|---|---|---|---|---|---|---|---|
| 1 | A1 | 1.28 | 817 | 334 | 119 | 746.1 | 319.7 |
| 2* | A1 | 1.28 | 765 | 488 | — | 60% | 40% |

| Ex | C6, g liquid phase | activity kg/g$_{MC}$/h | I.V. (dL/g) THN | M$_w$/M$_n$ | C$_3$ % mol | C$_4$ % mol | C$_6$ % mol |
|---|---|---|---|---|---|---|---|
| 1 | 117.8 | 111 | 1.26 | 2.8 | 75.8 | 19.5 | 4.7 |
| 2* | — | 102 | 1.30 | 2.2 | 74.2 | 25.8 | — |

*comparative

TABLE 2

| Ex | T$_m$(II) ° C. | ΔH$_f$(II) J/g | T$_g$ (DMTA, tanδ) ° C. | Tensile Modulus (DMTA) (MPa) (23° C.) |
|---|---|---|---|---|
| 1 | 94.2 | 18.5 | −20 | 38 |
| 2* | 73.3 | n.a. | n.a. | 250 |

*comparative
n.a. not available

By comparing the terpolymer according to the present invention and the copolymer obtained in the comparative example 2 clearly results that the copolymer has a melting point lower than the corresponding terpolymer and additionally the tensile modulus is considerably lower.

The invention claimed is:

1. A process for obtaining a propylene-based terpolymer comprising contacting under polymerization conditions, propylene, 1-butene and an alpha olefin of formula CH$_2$=CHZ wherein Z is a C$_4$-C$_{20}$ alkyl radical, in the presence of a catalyst system obtained by contacting:

a) at least one metallocene compound having the formula (II) or (III):

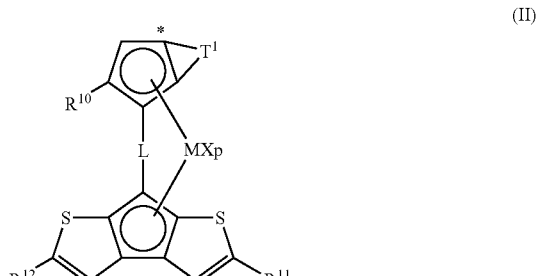

(II)

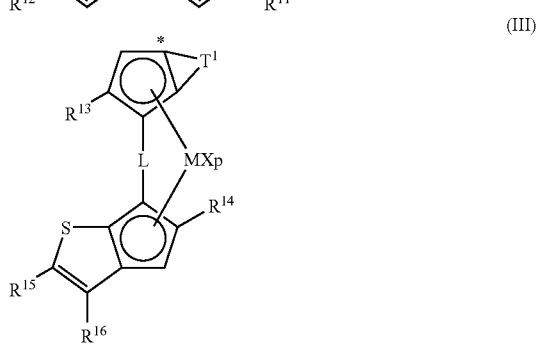

(III)

wherein

M is a transition metal belonging to group 4, 5 or to the lanthanide or actinide groups of the Periodic Table of the Elements;

the substituents X, equal to or different from each other, are monoanionic sigma ligands selected from the group consisting of hydrogen, halogen, R$^6$, OR$^6$, OCOR$^6$, SR$^6$, NR$^6_2$ and PR$^6_2$, wherein R$^6$ is a linear or branched, saturated or unsaturated C$_1$-C$_{20}$ alkyl, C$_3$-C$_{20}$ cycloalkyl, C$_6$-C$_{20}$ aryl, C$_7$-C$_{20}$ alkylaryl or C$_7$-C$_{20}$ arylalkyl group, optionally containing at least one Si or Ge atom;

p is an integer equal to the oxidation state of the metal M minus 2;

L is a divalent bridging group selected from C$_1$-C$_{20}$ alkylidene, C$_3$-C$_{20}$ cycloalkylidene, C$_6$-C$_{20}$ arylidene, C$_7$-C$_{20}$ alkylarylidene, or C$_7$-C$_{20}$ arylalkylidene radicals optionally containing heteroatoms belonging to groups 13-17 of the Periodic Table of the Elements, and silylidene radical containing up to 5 silicon atoms, wherein in the compound of formula (II):

R$^{10}$ is a hydrogen atom, or a C$_1$-C$_{40}$ hydrocarbon radicals optionally containing heteroatoms belonging to groups 13-17 of the Periodic Table of the Elements;

R$^{11}$ and R$^{12}$, equal to or different from each other, are hydrogen atoms or C$_1$-C$_{40}$ hydrocarbon radicals optionally containing heteroatoms belonging to groups 13-17 of the Periodic Table of the Elements;

T$^1$ is a moiety of formula (IIa) or (IIb):

(IIa)

-continued

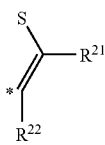
(IIb)

wherein the atom marked with the symbol * bonds the atom marked with the same symbol in the compound of formula (II);

$R^{17}, R^{18}, R^{19}$ and $R^{20}$, equal to or different from each other, are hydrogen atoms, or $C_1$-$C_{40}$ hydrocarbon radicals optionally containing heteroatoms belonging to groups 13-17 of the Periodic Table of the Elements;

$R^{21}$ and $R^{22}$, equal to or different from each other, are hydrogen atoms or $C_1$-$C_{40}$ hydrocarbon radicals optionally containing heteroatoms belonging to groups 13-17 of the Periodic Table of the Elements;

wherein in the compound of formula (III):

$R^{13}$ and $R^{14}$, equal to or different from each other, are hydrogen atoms, or $C_1$-$C_{40}$ hydrocarbon radicals optionally containing heteroatoms belonging to groups 13-17 of the Periodic Table of the Elements; and $R^{15}$ and $R^{16}$, equal to or different from each other, are hydrogen atoms or $C_1$-$C_{40}$ hydrocarbon radicals optionally containing heteroatoms belonging to groups 13-17 of the Periodic Table of the Elements;

b) an alumoxane or a compound that forms an alkyl metallocene cation; and optionally c) an organo aluminum compound, wherein the propylene-based terpolymer comprises:
  a. from 10.0% by mol to 79.0% by mol of propylene derived units;
  b. from 89.5% by mol to 20.5% by mol of 1-butene derived units; and
  c. from 0.5% by mol to 15% by mol of derived units of alpha olefin of formula $CH_2$=CHZ wherein Z is a $C_4$-$C_{20}$ alkyl radical; and
  d. a melting point higher than the corresponding propylene/1-butene copolymer having the same content of propylene derived units,
  and the polymerization is conducted in solution with a polymerization medium of 1-butene, propylene and the alpha olefin of formula $CH_2$=CHZ.

2. The process according to claim 1 wherein the metallocene compounds have $C_1$, $C_2$ or $C_2$-like symmetry.

3. The process according to claim 1 wherein the polymerization temperature ranges from 20° C. to 100° C.

4. The process according to claim 1 wherein in the compound of formula (II):
$R^{10}$ is linear or branched, saturated or unsaturated $C_1$-$C_{20}$-alkyl radicals, optionally containing heteroatoms belonging to groups 13-17 of the Periodic Table of the Elements;

$R^{11}$ and $R^{12}$ are linear or branched, $C_1$-$C_{20}$-alkyl radicals;

$R^{17}$ is a linear or branched, saturated or unsaturated $C_1$-$C_{20}$-alkyl radical, optionally containing heteroatoms belonging to groups 13-17 of the Periodic Table of the Elements;

$R^{19}$ is a hydrogen atom or a $C_1$-$C_{10}$-alkyl radical;

$R^{20}$ is a hydrogen atom or linear or branched, saturated or unsaturated $C_1$-$C_{20}$-alkyl radical, optionally containing heteroatoms belonging to groups 13-17 of the Periodic Table of the Elements;

$R^{21}$ is a hydrogen atom or a linear or branched, cyclic or acyclic $C_1$-$C_{20}$-alkyl radical; and $R^{22}$ is a $C_1$-$C_{40}$-alkyl, $C_6$-$C_{40}$-aryl or a $C_7$-$C_{40}$-arylalkyl radical.

5. The process according to claim 1 wherein in the compound of formula (III):
$R^{13}$ and $R^{14}$ are linear or branched, saturated or unsaturated $C_1$-$C_{20}$-alkyl radicals, optionally containing heteroatoms belonging to groups 13-17 of the Periodic Table of the Elements;

$R^{16}$ is a $C_1$-$C_{40}$-alkyl, $C_6$-$C_{40}$-aryl or a $C_7$-$C_{40}$-arylalkyl;

$R^{15}$ is a hydrogen atom or a linear or branched, cyclic or acyclic $C_1$-$C_{20}$-alkyl radical;

$R^{17}$ is a linear or branched, saturated or unsaturated $C_1$-$C_{20}$-alkyl radical, optionally containing heteroatoms belonging to groups 13-17 of the Periodic Table of the Elements;

$R^{19}$ is a hydrogen atom or a $C_1$-$C_{10}$-alkyl radical;

$R^{20}$ is a hydrogen atom or linear or branched, saturated or unsaturated $C_1$-$C_{20}$-alkyl radical, optionally containing heteroatoms belonging to groups 13-17 of the Periodic Table of the Elements;

$R^{21}$ is a hydrogen atom or a linear or branched, cyclic or acyclic $C_1$-$C_{20}$-alkyl radical; and $R^{22}$ is a $C_1$-$C_{40}$-alkyl, $C_6$-$C_{40}$-aryl or a $C_7$-$C_{40}$-arylalkyl radical.

6. The process according to claim 4 wherein $R^{22}$ is a moiety of formula (IV):

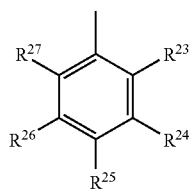
(IV)

wherein $R^{23}$, $R^{24}$, $R^{25}$, $R^{26}$ and $R^{27}$, equal to or different from each other, are hydrogen atoms or $C_1$-$C_{20}$ hydrocarbon radicals.

7. The process according to claim 3 wherein the polymerization temperature ranges from 50° C. to 90° C.

* * * * *